United States Patent
Kornmann et al.

(10) Patent No.: US 10,091,336 B2
(45) Date of Patent: Oct. 2, 2018

(54) COMPUTING PLATFORM AGNOSTIC APPLICATION SERVER

(71) Applicant: SAP SE, Walldorf (DE)

(72) Inventors: Tim Kornmann, Reilingen (DE); Rene Gross, Heidelberg (DE); Thomas Biesemann, Bruchsal (DE); Jens Kisker, Heidelberg (DE)

(73) Assignee: SAP SE, Walldorf (DE)

( * ) Notice: Subject to any disclaimer, the term of this patent is extended or adjusted under 35 U.S.C. 154(b) by 219 days.

(21) Appl. No.: 14/976,560

(22) Filed: Dec. 21, 2015

(65) Prior Publication Data

US 2017/0180517 A1 Jun. 22, 2017

(51) Int. Cl.
*G06F 15/16* (2006.01)
*H04L 29/06* (2006.01)
*H04L 29/08* (2006.01)

(52) U.S. Cl.
CPC .............. *H04L 69/18* (2013.01); *H04L 67/10* (2013.01)

(58) Field of Classification Search
None
See application file for complete search history.

(56) References Cited

U.S. PATENT DOCUMENTS

| | | | |
|---|---|---|---|
| 9,197,720 B2* | 11/2015 | Fernandez-Ruiz | H04L 67/42 |
| 9,866,433 B1* | 1/2018 | Fakhouri | H04L 41/0806 |
| 2008/0091757 A1* | 4/2008 | Ingrassia | G06T 11/001 |
| | | | 708/490 |
| 2013/0332510 A1* | 12/2013 | Pritchett | H04L 67/10 |
| | | | 709/203 |
| 2014/0280959 A1* | 9/2014 | Bauer | H04L 67/1008 |
| | | | 709/226 |
| 2015/0281401 A1* | 10/2015 | Le | H04L 67/42 |
| | | | 709/203 |
| 2017/0118268 A1* | 4/2017 | Wu | H04L 67/02 |

* cited by examiner

*Primary Examiner* — Brian Whipple
(74) *Attorney, Agent, or Firm* — Brake Hughes Bellermann LLP

(57) ABSTRACT

A method includes providing a cloud-side database storing data, an objects model of the data, and a user interface (UI) model of the data. The method further involves providing an instance of an application server coded in JavaScript, for example, in a Node.js cross-platform runtime environment. The instance of the application server coded in JavaScript includes the logic of an application coded to process the data. The application logic is executed (and data processed) on either the client-side or on the cloud-side. The execution of the application logic (and processing of the data) is dynamically switchable between the client-side and the cloud-side.

19 Claims, 6 Drawing Sheets

COMPUTING PLATFORM AGNOSTIC APPLICATION SERVER

BACKGROUND

An application or software can carry out a function, for example, an accounting or payroll function. Applications are used to increase productivity, to measure productivity and to perform enterprise or corporate functions accurately. The applications may, for example, include applications in the fields of customer relationship management (CRM), enterprise resource planning (ERP), enterprise content management (ECM), business process management (BPM) and product lifecycle management, etc. The applications are commonly installed on "backend" computer systems that deal with databases and have data processing components. Each backend computer system's infrastructure may consist of one or more physical machines, virtual machines, central processing units, data storage devices, disk drives and other resources, distributed over diverse locations or nodes connected by a computer network. The applications can have interactive user-application interfaces. Users on client computing devices (e.g., laptop computers, desktop computers, notebook computers, etc.) can connect to a backend computer system to access or manipulate data stored in databases hosted on the backend computer system, (e.g., to run analytics and reports).

With the ready availability of advanced computing and communications technologies, "on premise" installation of an application by each organization or enterprise may not be needed or economically desirable. The backend computer systems or supporting infrastructure (e.g., an application server) for the application can be placed in the "cloud" (e.g., by a third-party provider) and the application can be offered as a cloud computing service to remote clients or end users. The remote clients or end users may have diverse technological needs or interaction capabilities. For example, the remote clients or end users may have or use heterogeneous computing platforms (e.g., smartphone, desktop PC, tablet, embedded devices, etc.) using different programming/markup languages or having different input/output capabilities (e.g., keyboard, mouse, (multi-)touch, data gloves, motion sensors, monitors, head-mounted displays) with different interaction modalities (e.g., graphics, speech, haptics, gesture, etc.).

Consideration is now being given to ways of providing an application as a cloud computing service to remote clients or end users having diverse technological needs or interaction capabilities in a practical and effective manner.

SUMMARY

In a general aspect, a system deployed as a networked or cloud computing arrangement includes a cloud-side database and an instance of an application server coded in JavaScript. The cloud-side database stores data (e.g., enterprise or organization's data), an objects model of the data, and a user interface (UI) model of the data. The instance of the application server includes the application logic of an application coded to process the data.

In an aspect, the instance of the application server coded in JavaScript is provided in a Node.js cross-platform runtime environment and includes a BO model interpreter and a UI data model interpreter.

In a further aspect, the instance of the application server coded in JavaScript is configured to process data stored in a client-side database and includes a data synchronizer configured to synchronize data stored in the cloud-side database and data stored in a client-side database.

In yet another aspect, the instance of the application server coded in JavaScript is disposed in a client-side computing device.

In yet another further aspect, the instance of the application server coded in JavaScript is dynamically distributed across the cloud-side and the client-side in consideration, for example, of a dynamic computing load on the cloud-side and/or availability of network connectivity. The application logic of the application can be executed on either the client-side or cloud-side. Execution of the application logic (and corresponding processing of data) can be switched dynamically between the client-side and the cloud-side.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

Figure 1:
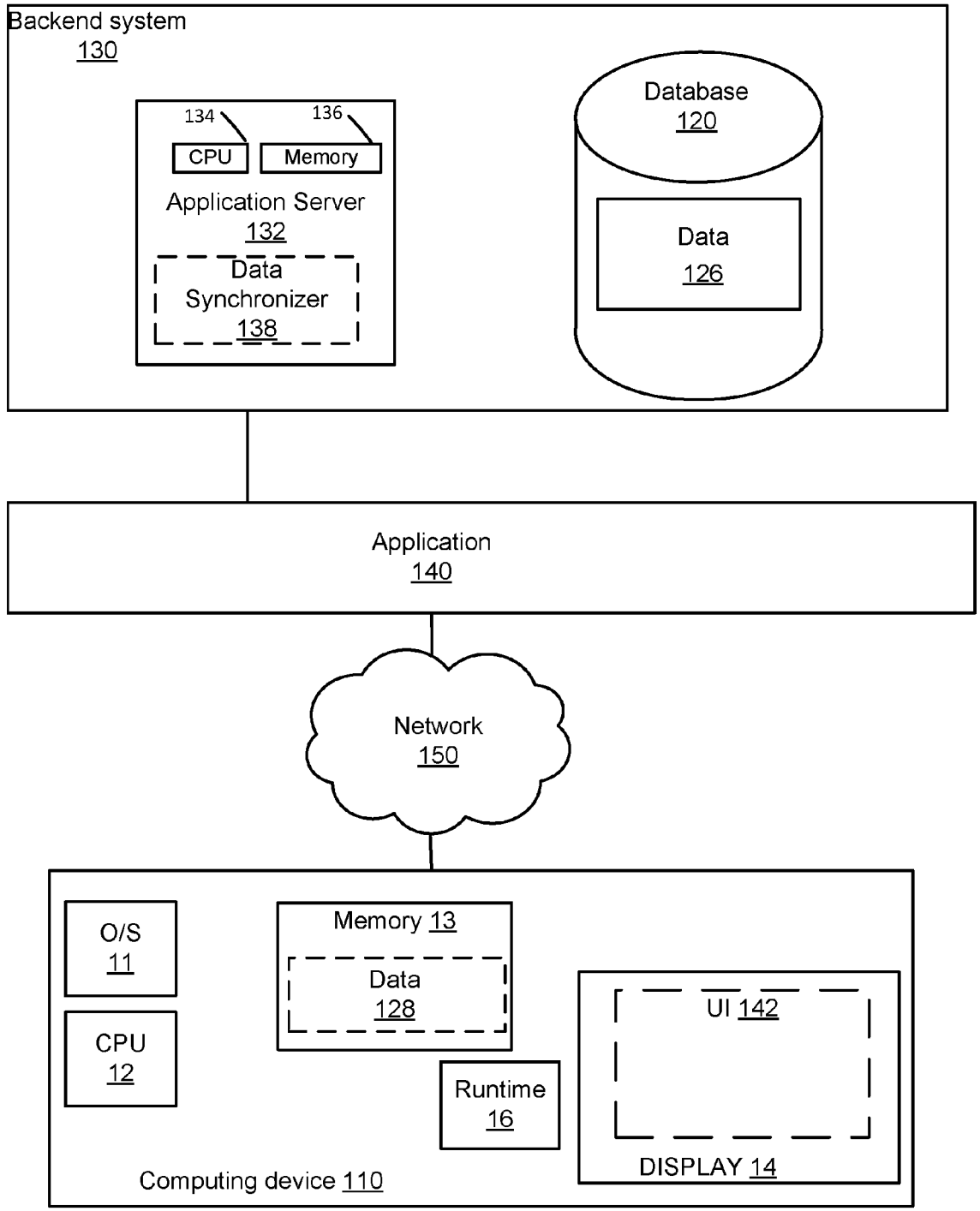
FIG. 1 is a schematic block diagram illustrating an example system, which may be used to implement a computing solution, in accordance with the principles of the present disclosure.

The details of one or more implementations are set forth in the accompanying drawings and the description below. Other features will be apparent from the description and drawings, and from the claims.

DETAILED DESCRIPTION

A cloud computing environment may include a cloud-side application server hosting an application, a cloud-side database, a network, and a client-side computing device. The application may include application logic coded to process data according to a data model for a process (e.g., a process of an organization or enterprise).

In accordance with the principles of the present disclosure, the application server (including the application logic of the application) in the cloud-computing environment may be implemented in a common programming language (e.g., JavaScript), which is the same as a programming language used by the client-side computing device. The "JavaScript" application server may be implemented, for example, in Node.js, which is an open-source, cross-platform runtime environment for developing server-side web applications. Further, an instantiation of the JavaScript application server (including the application logic of the application and related model information) may be realized on the client-side computing device making the same application logic available on both the cloud-side application server and the client-side computing device to process data. The application logic of the JavaScript application server may be agnostic with respect to the computing platforms, locations and hardware (e.g., a cloud server, an on premise sever, a client computing device, etc.) on which the application may be installed or executed.

A computing solution may involve a backend computer system including an application server (which may be a physical machine or a virtual machine). The application server may host an application (e.g., a customer relations management (CRM) application, an enterprise resource planning (ERP), an enterprise content management (ECM), a business process management (BPM), or a product life-cycle management application, etc.) and support one or more frontend delivery vehicles (mobile apps, web browsers, desktop applications, connected objects, application agents, etc.) that are hosted on one or more network-connected client computing devices (e.g., laptop computers, desktop computers, mobile devices, smartphones, etc.). The computing solution may, for example, involve manipulating, preparing or consuming data, which may be stored in "backend" databases in the backend computer system, and also involve manipulating, preparing or consuming data, which may be stored in "local" databases or data stores in the client computing devices.

One or more aspects of an example application (e.g., a customer relationship management (CRM) application) hosted on the application server may be model based. The application may include application logic (i.e. program code) to conduct a sequence of operations associated with data in a database according to rules (or procedures) specific to how things are done in or by an organization or enterprise. The rules may be determined with reference to a data model. Further, the application may, for example, utilize an objects data model as an abstraction of how entities (e.g., sales personnel, product stores, customer information and documents, etc.) need to be related and how they need to collaborate in order for the application to perform the customer relationship management functions of the organization or enterprise (e.g., generate a sales quotation, etc.). Further, the application may, for example, utilize a user interface (UI) data model to determine which data and how the data should be presented on user interfaces (e.g., on the client computing devices).

The client computing devices can be "online" or "offline." The terms "online" and "offline" may have specific meanings in regard to computer technology and telecommunications in which "online" indicates a state of connectivity, while "offline" indicates a disconnected state. Users may interactively prepare or modify data (including objects such as data input forms, purchase orders, sales quotes, invoices, etc.) for consumption or processing by the application when connected online to the backend computer system. Conversely, users may prepare new data or modify data (including objects such as data input forms, purchase orders, sales quotes, invoices, etc.) locally on the client computing devices when offline, and later, when online, upload or transmit the new data or modified data to the backend computer system for consumption or processing by the application or storage in the database.

FIG. 1 shows a schematic block diagram of an example system 100, which may be used to implement a computing solution, in accordance with the principles of the present disclosure.

System 100 may include a backend computer system 130, which includes an application server 132. Application server 132, which may be a model driven application server, may host an application 140, and may be connected to one or more client computing devices (e.g., client computing device 110) via a computer network or the Internet (e.g., network 150). Application server 132 may be connected to one or more databases (e.g., database 120), which may store data (e.g., data 126) that is manipulated or processed by application 140.

Application 140 may have a frontend (e.g., UI 142, which may include frontend delivery vehicles, application agents, web browsers, etc.) presented on a client computing device 110 through which a user can operate or interact with application 140. Application server 132 may include one or more CPUs and memories (e.g., CPU 134 and memory 136), which may be configured to deliver, for example, various content (e.g., data 126, application agents, web browsers, frontend user interface (UI 142), data storage, etc.) to client computing devices (e.g., client computing device 110) via a computer network 150 or the Internet.

A client computing device (e.g., client computing device 110) may, for example, be a desktop computer, a notebook computer, a netbook computer, a tablet computer, a smartphone or another mobile computing device, etc. An example client computing device (e.g., client computing device 110) may include an operating system (e.g., O/S 11), one or more processors (e.g., CPU 12), one or more memories or data stores (e.g., memory 13), and a display (e.g., display 14). Computing device 110 may execute a runtime 16 and various applications (e.g., a web application, a word processing application, a spreadsheet application, application 140 agents, etc.) to process locally stored data (e.g., data 128) for application 140.

FIGS. 2, 3A, 3B and 4 show layer diagrams of example architectural implementations (e.g., architectures 200, 300A, 300B and 400, respectively) of system 100/application 140 extending over cloud computing environments and client computing devices.

Architecture 200

Figure 2:
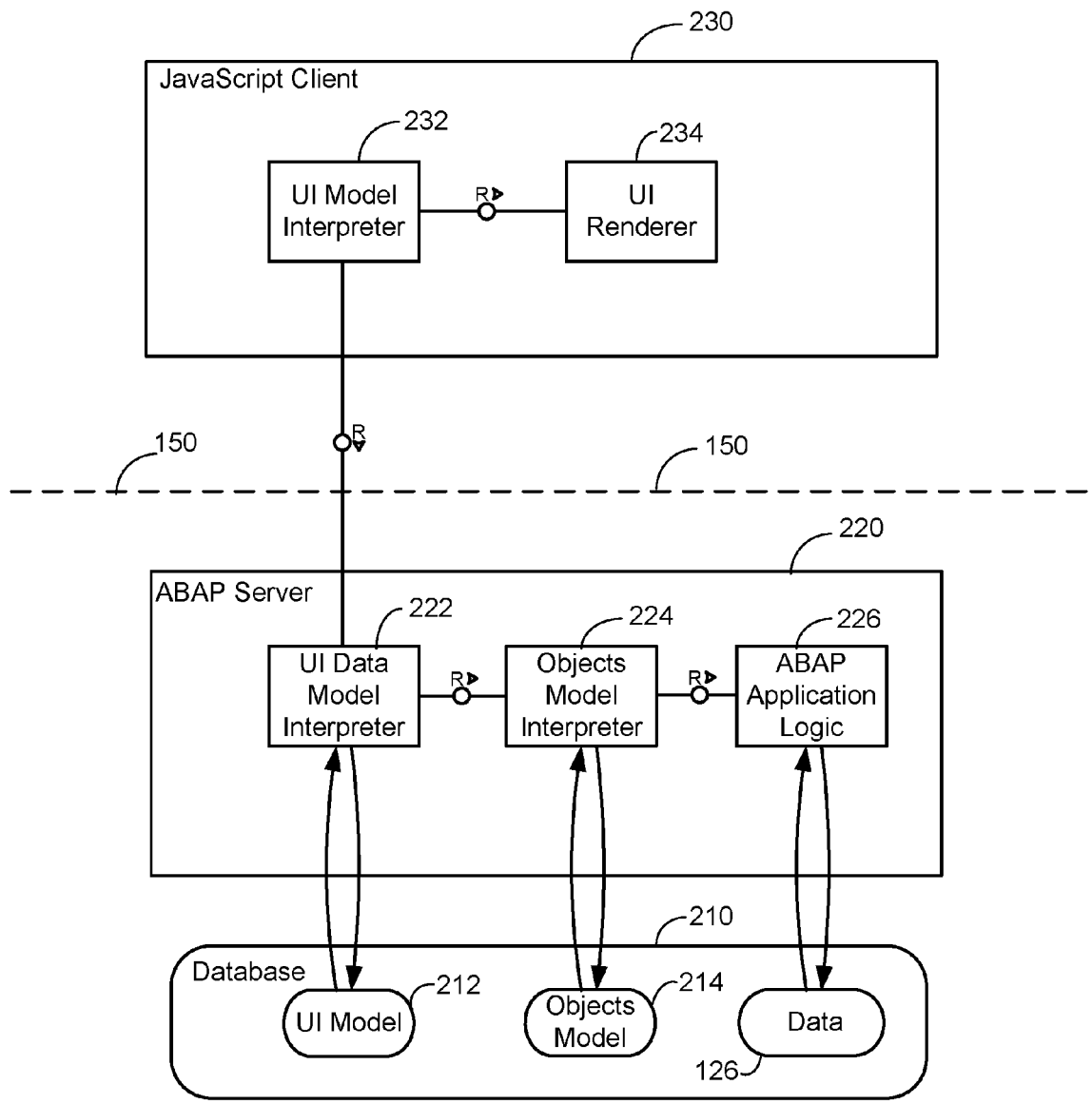
FIG. 2 is a layer diagram illustrating an example architectural implementation of a computing system in a cloud computing environment.

Model-based application 140 may be implemented in a traditional manner as shown, for example, in architecture 200 (FIG. 2). Architecture 200 may include a stack of architectural layers—a database layer 210 and a server layer 220 in a cloud environment, separated by a network connection 150 from a client side layer 230. In architecture 200, database layer 210 and a server layer 220 may be implemented, for example, in database 120 and application server 132, respectively (FIG. 1). Client side layer 230 may, for example, be implemented in computing device 110 (FIG. 1).

Database layer 210, which includes data 126, may further include a UI data model 212 and an objects model 214. Objects model 214 may, for example, define an entity relationship database schema and the application logic for the schema (e.g., Customer Object). For each named object, objects model 214 may define a set of instance variables or properties (also known as attributes) and associations with other objects. For example, an object named "Principal" in the database may be defined to have attributes "Name", "Second name", "Age", "Area", "Country", and hold an 1-n association with employees (a collection of Employee instances). UI data model 212 may define how a particular user interface for an object looks like and how the particular user interface interacts with the object.

Application server 132 (on which application 140 is executed in the cloud environment) may, in the traditional manner, be a model-based ABAP server and may provide an ABAP-based computing platform for server layer 220. Server layer 220 may include an application logic 226 of application 140, which may be coded in ABAP to process data (e.g., data 126). Server layer 220 may further include a UI dataModel interpreter 222 and a BO model interpreter 224, which are configured to use UI data model 212 and an objects model 214, respectively, of database layer 210.

In architecture 200, client side layer 230 (implemented in computing device 110) may be supported on a JavaScript computing platform, which uses a different language (e.g., Jscript) that the ABAP language used in the ABAP computing platform on the server side. Client side layer 230 may include a UI model interpreter 232 and UI renderer 234 for interpreting and displaying an object (e.g., a sales quotation form), which may be requested by a user of computing device 110. When computing device 110 is connected to application server 132 via network connection 150, UI model interpreter 232 may utilize the facilities of server layer 220 (e.g., UI dataModel interpreter 222, BO model interpreter 224, and application logic 226) to retrieve the object (e.g., the sales quotation form) from data 126 in database layer 210. UI model interpreter 232 may render the retrieved object (e.g., the sales quotation form), for example, on display 14 of computing device 110, using UI renderer 234.

In architecture 200, computing device 110 does not have access to database layer 210 and server layer 220 when computing device 110 is offline (i.e. is not connected to application server 132). Thus, when offline a user of computing device 110 will be unable to access or work with application 140/data (e.g., data 126).

Figure 3A:
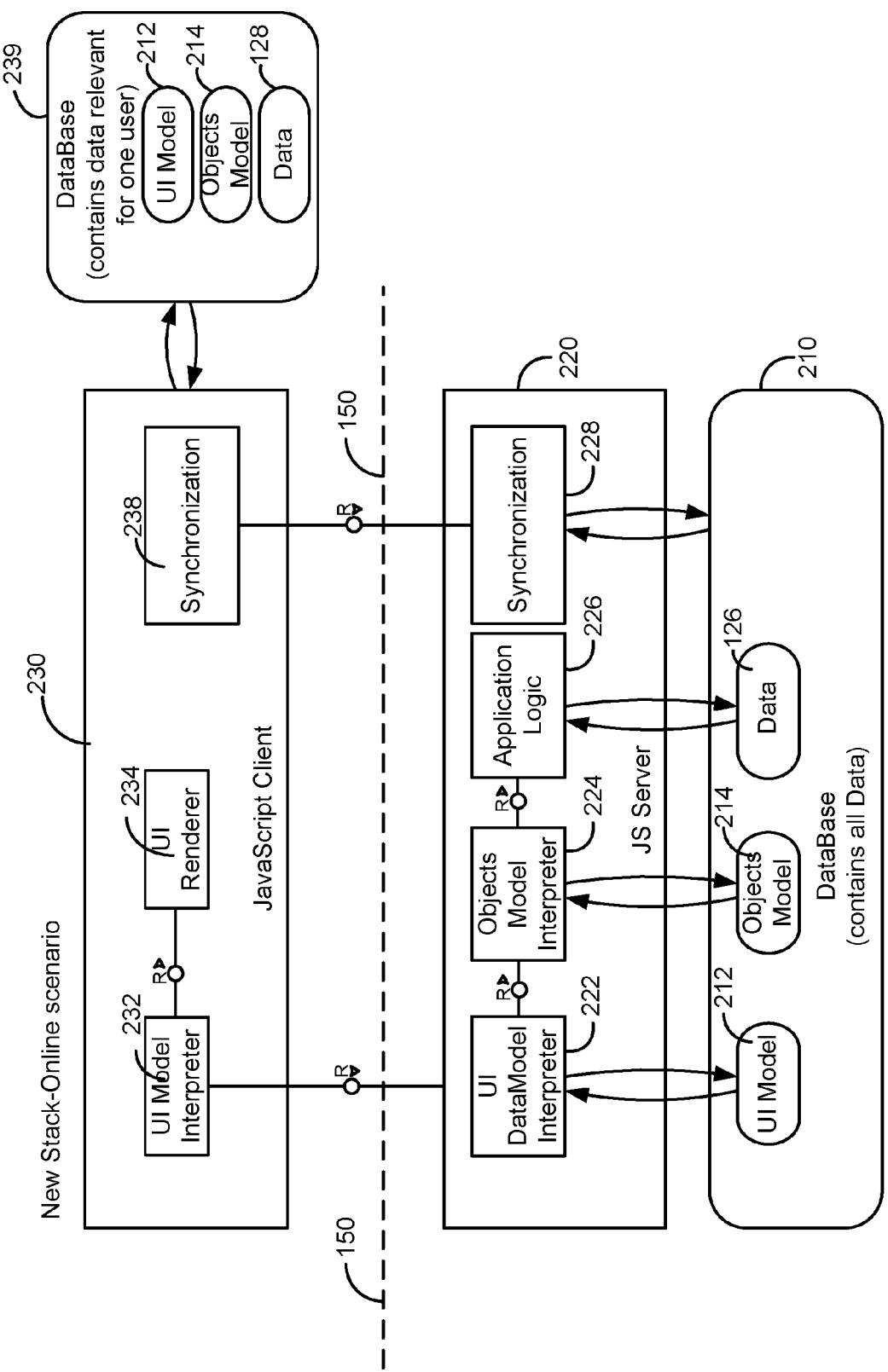
FIG. 3A is a layer diagram illustrating an example architectural implementation of a computing system in a cloud computing environment including a JavaScript server and an online client-side computing device, in accordance with the principles of the present disclosure.
Figure 3B:
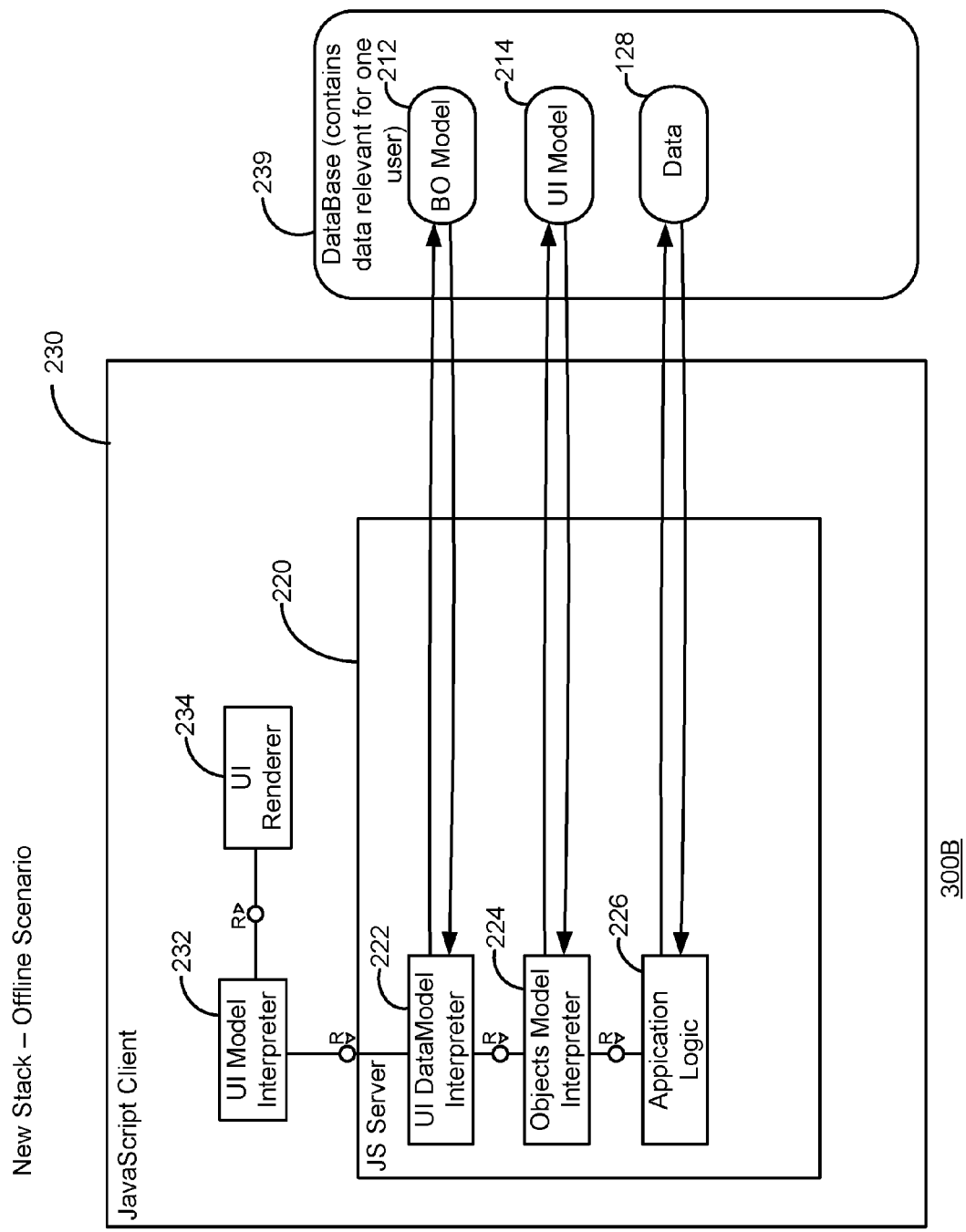
FIG. 3B is a layer diagram illustrating an example architectural implementation of a computing system in a cloud computing environment including a JavaScript server and an offline client-side computing device, in accordance with the principles of the present disclosure.
Figure 4:
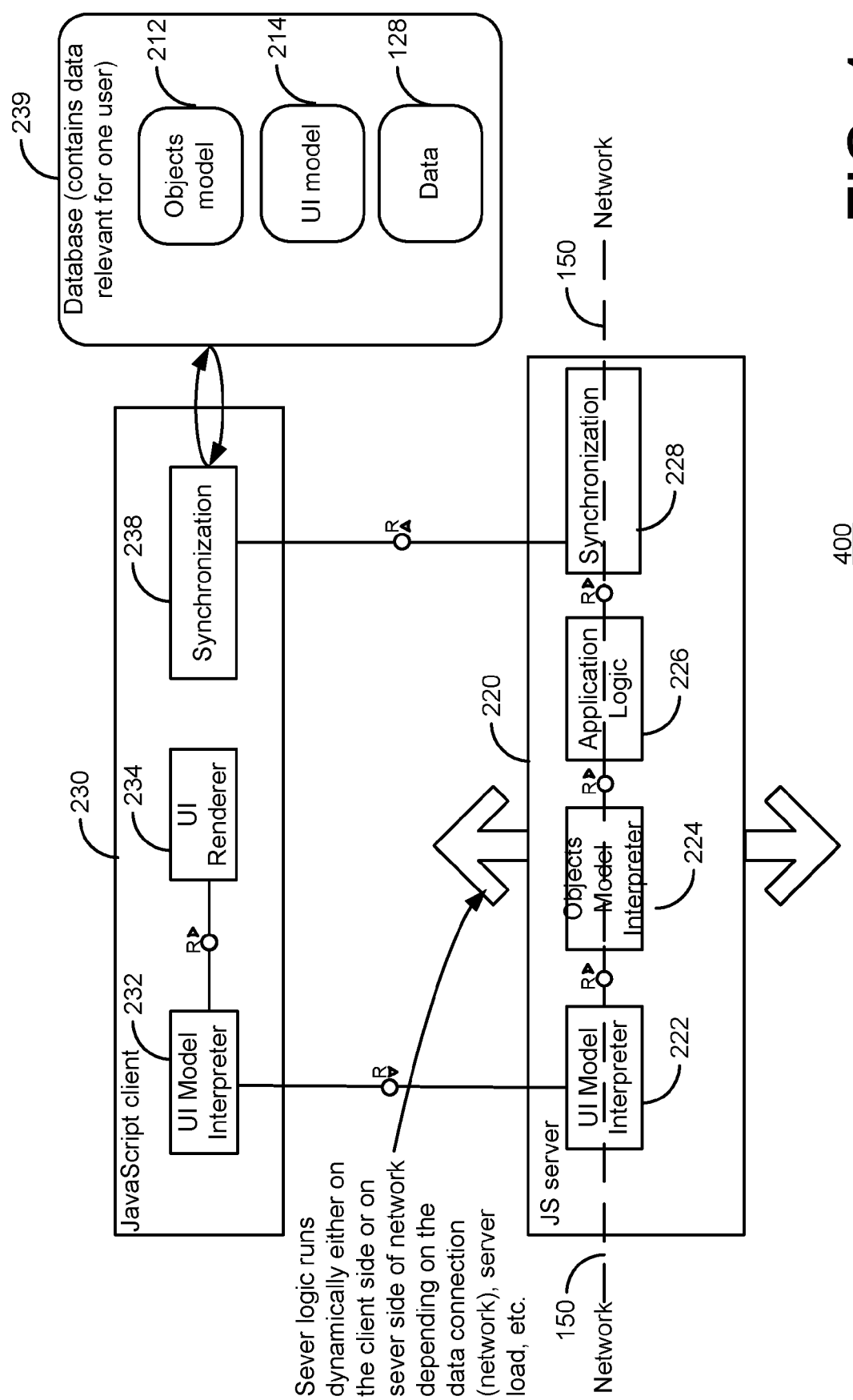
FIG. 4 is a layer diagram illustrating an example architectural implementation of a computing system in a cloud computing environment including a dynamically placed JavaScript server and an online client-side computing device, in accordance with the principles of the present disclosure.

In contrast to architecture 200, which may be based on a traditional ABAP server, architectures 300A, 300B and 400 described below with reference to FIGS. 3A, 3B and 4, respectively, may be based on JavaScript servers, in accordance of the principles of the present disclosure.

Architecture 300A—Online Scenario

Model-based application 140 may be implemented as shown, for example, in architecture 300A (FIG. 3A) for an online scenario in which computing device 110 is connected to the application server (e.g., application server 132) running application 140. Architecture 300A, like architecture 200, may include database layer 210 and server layer 220 in a cloud computing environment separated by network connection 150 from client-side layer 230. However, in architecture 300A for the online scenario, server layer 220 may be implemented in a JavaScript server (e.g., a JavaScript application server 132). Server layer 220 may be supported on a JavaScript computing platform (i.e. in a JavaScript server) using the same language (e.g., Jscript) used for client-side layer 230 (which is implemented, for example, in computing device 110).

Further, in architecture 300A, client-side layer 230 may explicitly include a database 239 (implemented, for example, in memory 13 of computing device 110). Database 239 may include copies or instances of some or all data (e.g., data 128, UI data model 212 and BO model 214) in database layer 210. Client-side layer 230 and server layer 220 may also include a synchronization element 238 and a synchronization element 228, respectively. Synchronization elements 238 and 228 may be configured to update or synchronize data (e.g., data 128) in database 239 on computing device 110 and data (e.g., data 126) in database 120.

As described above with reference to architecture 200 (FIG. 2), in architecture 300A, when computing device 110 is connected to application server 132 via network connection 150, UI model interpreter 232 may utilize the facilities of server layer 220 (e.g., UI dataModel interpreter 222, BO model interpreter 224, and application logic 226) to retrieve the object (e.g., the sales quotation form) from data 126 in database layer 210. UI model interpreter 232 may render the retrieved object (e.g., the sales quotation form), for example, on display 14 of computing device 110, using UI renderer 234.

Further, when computing device 110 is connected to application server 132 via network connection 150, synchronization elements 238 and 228 may coordinate updating or synchronization of data in database 239 (e.g., data 128) stored on computing device 110 and the data (e.g., data 126) in database layer 210 (stored for example, database 120). The updating or synchronization of the data in the databases may occur at regular or pre-determined intervals, or in response to specific events (e.g., when a user logs in on computing device 110, or when computing device 110 comes online, or upon user request).

In architecture 300A, because computing device 110 has access to database layer 210 and server layer 220 when computing device 110 is online, a user of computing device 110 can work with data 126 in database 120 when computing device 110 is online. The user can also work with data (i.e. data 128), which is "locally" stored on computing device 110, using, for example, application logic 226 available in server layer 220.

Architecture 300B—Offline Scenario

Model-based application 140 may be implemented as shown, for example, in architecture 300B (FIG. 3B) for an offline scenario in which computing device 110 is not connected to the cloud-side application server (e.g., application server 132). Architecture 300B, like architectures 200 and 300A, may include a database layer 210 and a server layer 220. However, in architecture 300B for the offline scenario, in contrast to architecture 300A, server layer 220 may be implemented in client-side layer 230 in computing device 110 itself. Server layer 220 may be implemented for example, as a virtual instance of a JavaScript server in computing device 110.

Further, in architecture 300B, like in architecture 300A, client-side layer 230 may explicitly include database 239 (implemented, for example, in memory 13 of computing device 110). In architecture 300B, database 239 may include copies or instances of previously updated or synchronized data (e.g., data 128, UI data model 212 and BO model 214) from database layer 210. The copies or instances of data (e.g., data 128, UI data model 212 and BO model 214) in database 239 may include data that was previously updated of synchronized (e.g., by synchronization elements 238 and 228 (FIG. 3A)) when computing device 110 was last connected to the cloud-side application server (e.g., application server 132).

In architecture 300B, computing device 110 has access to locally stored data (e.g., data 128) and server layer 220 (e.g., application logic 226) when computing device 110 is offline. A user of computing device 110 can work with data 128 using the locally available application logic 226 of application 140. Using the same application logic 226 of application 140 in the online and offline modes of computing device 110 may ensure that when data 128 on computing device 110, which is locally created or modified on computing device 110 in the offline mode, is synchronized back to the cloud-side application server (e.g., application server 132), the data is consistent and synchronization errors or conflicts are minimized.

Architecture 400—Dynamic Scenario

Model-based application 140 may be implemented as shown, for example, in architecture 400 (FIG. 4) for a dynamic scenario in which computing device 110 is in either online or offline modes. In architecture 400, the application logic may be executed (and data processed) on either the client side or on the cloud side. The execution/processing may be switched dynamically between the client side and the cloud side.

In architecture 400, like in architectures 300A and 300B, client-side layer 230 may explicitly include database 239 (implemented, for example, in memory 13 of computing device 110). Database 239 may include copies or instances of previously updated or synchronized data (e.g., data 128, UI data model 212 and BO model 214).

However, unlike in architectures 300A and 300B where server layer 210 is instantiated either on the cloud-side or on the client-side depending on whether computing device 110 is online or offline, respectively, in architecture 400, an instantiation of server layer 210 may be dynamically distributed across the cloud-side and the client-side even when computing device 110 is online. A user of computing device may use application logic 226 of application 140 to process data regardless of where the instantiation of server layer 210 is placed (e.g., on the cloud-side or the client-side). A degree of the dynamic distribution (i.e. how much of the instance is on the cloud-side and how much is on the client-side) may be determined based, for example, on consideration of the dynamic computing load on the cloud-side and may be designed to shift the computing load to the client-side when possible. Shifting the computing load to the client-side in this manner may save cloud server capacity and resources and may have an impact on hosting costs (and total costs of ownership) of the cloud service provider.

In an example use case of architectures 300A, 330B and 400, a sales representative may, when online, create Customer Data in the cloud (e.g. add address records to a "Customer Data" object stored in data 126) using server side instantiations of application logic 226 of application 140. The sales representative may synchronize the data to her smart device (e.g., computing device 110). The sales representative may, when offline, continue manipulating the data (e.g. adding addresses to the "Customer Data" object now stored in database 239/data 128) using client-side instantiations of application logic 226 of application 140. Using the same application logic 226 when offline as when online may ensure that the changes to the data made in the cloud and the changes to the data made on the computing device 110 are consistent i.e. follow the same rules (e.g., rules of BO model 214 such as "address must include a zip code", "a street name has to be added to address", "country field in address must not be empty", etc.) . . . .

Figure 5:
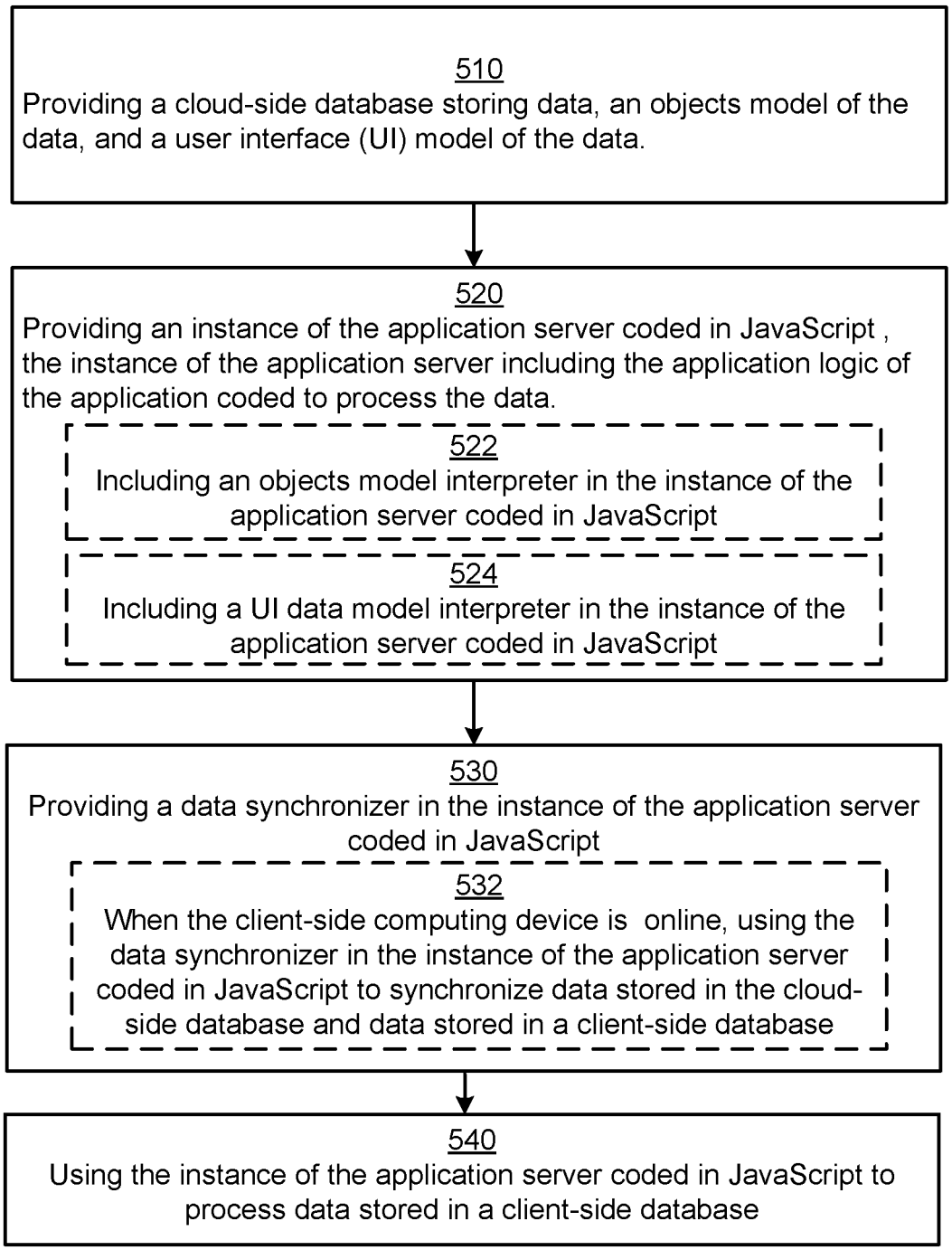
FIG. 5 illustrates an example method for processing data by an application in a networked or cloud computing arrangement, which includes a cloud-side sever and a client-side computing device, in accordance with the principles of the present disclosure.

FIG. 5 illustrates an example method 500 for processing data by an application in a networked or cloud computing arrangement, which includes a cloud-side sever and a client-side computing device, in accordance with the principles of the present disclosure. The client-side computing device may operate in either online or offline modes (i.e. connected or disconnected with the cloud-side sever). The cloud-side server may be a model-based application server hosting the application. The application may include application logic which processes the data with reference to an objects model and a user interface (UI) data model of the data. The application may have a frontend (including frontend UI components, application agents, web browsers, etc.) presented on the client-side computing device through which a user can operate or interact with the application. Example method 500 may be implemented in any networked or cloud computing arrangement (e.g., system 100, FIG. 1).

Method 500 includes providing a cloud-side database storing data, an objects model of the data, and a user interface (UI) model of the of the data (510), and providing an instance of an application server coded in JavaScript (520). The instance of the application server coded in JavaScript includes the application logic of the application coded to process the data. The instance of the application server coded in JavaScript may be provided in Node.js, which is an open-source, cross-platform runtime environment for developing server-side web applications.

Method 500 may further involve including a BO model interpreter in the instance of the application server coded in JavaScript (522), and including a UI data model interpreter in the instance of the application server coded in JavaScript (524).

Method 500 may further include providing a data synchronizer in the instance of the application server coded in JavaScript (530), and, when the client-side computing device is online, using the data synchronizer in the instance of the application server coded in JavaScript to synchronize data stored in the cloud-side database and data stored in a client-side database (532).

Method 500 may include using the instance of the application server coded in JavaScript to process data stored in a client-side database (540).

Further, in an example implementation of method 500, providing an instance of an application server coded in JavaScript 520 may include providing an instance of the application server coded in JavaScript in the client-side computing device itself. The instance of the application server coded in JavaScript in the client-side computing device may be used to process data (e.g., data stored in the client-side database), for example, when the client-side computing device is off-line.

In another example implementation of method 500, providing an instance of an application server coded in JavaScript 520 may include dynamically distributing the instance of the application server coded in JavaScript across the cloud-side and the client-side when the client-side computing device is online. The user of the client-side computing device may use the application logic in the instance of the application server to process data regardless where the instantiation of the application server is placed (i.e. either on the cloud-side or the client-side). Method 500 may include determining a degree of the dynamic distribution (i.e. how much time the instance is on the cloud-side and how much time it is on the client-side) based, for example, on consideration of the dynamic computing load on the cloud-side. The degree of the dynamic distribution may be designed to shift the computing load from the cloud-side to the client-side when possible.

The various systems, apparatus or techniques described herein may be implemented in digital electronic circuitry, or in computer hardware, firmware, software, or in combinations of them. The systems, apparatus and techniques may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Methods (e.g. method 500) may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems, apparatus or techniques may be implemented in a computing system that includes a backend component, e.g., as a data server, or that includes a middleware component, e.g., an application server, or that includes a frontend component, e.g., a client computer having a graphical user interface or a Web browser through which a user can interact with an implementation, or any combination of such backend, middleware, or frontend components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A method comprising:
coupling an application server coded in JavaScript to a cloud-side database storing data, an objects model of the data, and a user interface (UI) model of the data, the application server including application logic of an application coded to process the data; and
dynamically running an instance of the application server on either a cloud-side sever or on a client-side computing device to shift computing loads to the client-side based on consideration of the computing loads on the cloud-side, the instance of the application server being agnostic with regard to different types of computing platforms supported by the cloud side or the client side.

2. The method of claim 1, wherein coupling the application server coded in JavaScript includes providing an instance of the application server coded in JavaScript in a Node.js cross-platform runtime environment.

3. The method of claim 1, wherein coupling the application server coded in JavaScript includes providing an objects model interpreter in an instance of the application server coded in JavaScript.

4. The method of claim 1, wherein coupling the application server coded in JavaScript includes providing a UI data model interpreter in an instance of the application server coded in JavaScript.

5. The method of claim 1, further comprising using the instance of the application server coded in JavaScript to process data stored in a client-side database.

6. The method of claim 1, wherein coupling the application server coded in JavaScript includes providing a data synchronizer in an instance of the application server coded in JavaScript.

7. The method of claim 6 further comprising, when a client-side computing device is online, using the data synchronizer in the instance of the application server coded in JavaScript to synchronize data stored in the cloud-side database and data stored in a client-side database.

8. The method of claim 1, wherein coupling the application server coded in JavaScript includes providing an instance of the application server coded in JavaScript in the client-side computing device itself.

9. The method of claim 8, wherein providing the instance of the application server coded in JavaScript in the client-side computing device itself includes coupling the instance provided in the client-side computing device to a client-side database containing data.

10. The method of claim 1, wherein coupling the application server coded in JavaScript includes providing a dynamic distribution of the instance of the application server coded in JavaScript across the cloud-side and the client-side when the client-side computing device is online.

11. The method of claim 10, wherein providing a dynamic distribution includes determining a degree of the dynamic distribution based on consideration of a dynamic computing load on the cloud-side.

12. A system comprising:
a networked or cloud computing arrangement including a cloud-side database, the cloud side database storing data, an objects model of the data, and a user interface (UI) model of the data; and an application server coded in JavaScript coupled to the cloud-side database, the application server including application logic of an application coded to process the data, the computing arrangement configured to dynamically run an instance of the application server on either a cloud-side server or on a client-side computing device to shift computing loads to the client-side based on consideration of the computing loads on the cloud-side, the instance of the application server being agnostic with regard to different types of computing platforms supported by the cloud side or the client side.

13. The system of claim 12, wherein the instance of the application server coded in JavaScript is provided in a Node.j s cross-platform runtime environment.

14. The system of claim 12, wherein the instance of the application server coded in JavaScript includes a BO model interpreter.

15. The system of claim 12, wherein the instance of the application server coded in JavaScript includes a UI data model interpreter.

16. The system of claim 12, wherein the instance of the application server coded in JavaScript is configured to process data stored in a client-side database.

17. The system of claim 12, wherein the instance of the application server coded in JavaScript includes a data synchronizer configured to synchronize data stored in the cloud-side database and data stored in a client-side database.

18. The system of claim 12, wherein the instance of the application server coded in JavaScript is disposed in a client-side computing device.

19. The system of claim 12, wherein the instance of the application server coded in JavaScript is dynamically distributed across the cloud-side and the client-side in consideration of a dynamic computing load on the cloud-side.

* * * * *